United States Patent Office 2,949,793
Patented Aug. 23, 1960

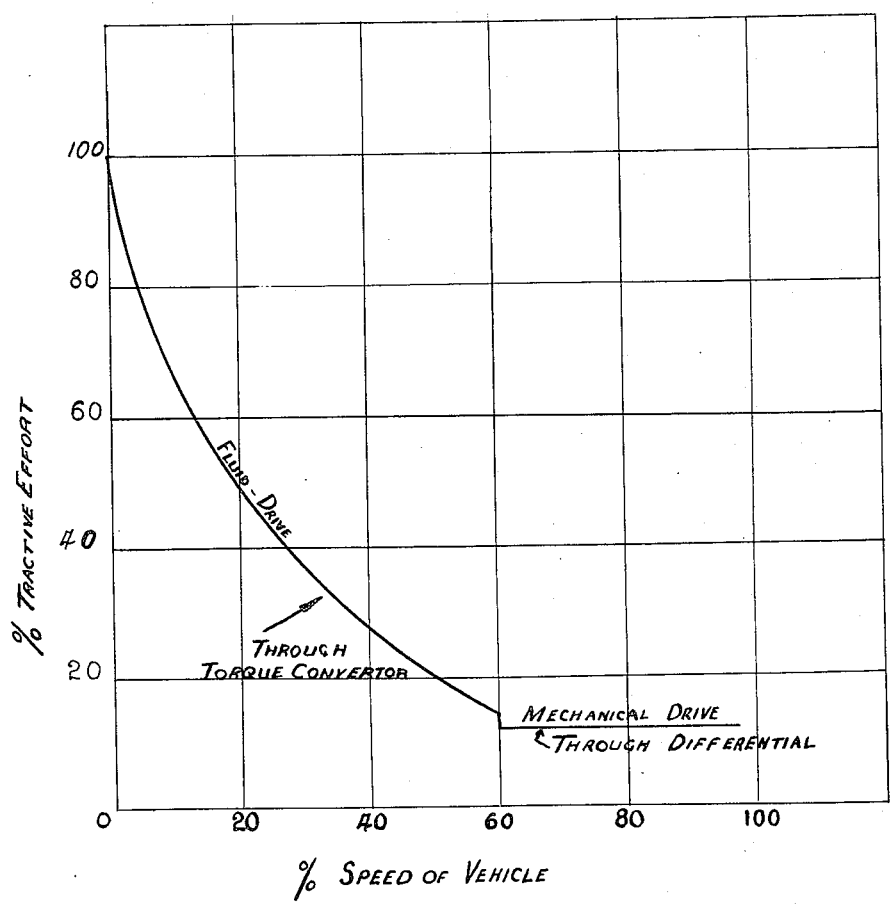

2,949,793

FLUID-MECHANICAL TRANSMISSION

Man Mohan Suri, London, England, assignor to The President of the Republic of India, New Delhi Filed June 27, 1957, Ser. No. 668,446

Claims priority, application Great Britain July 4, 1956

3 Claims. (Cl. 74—720.5)

This invention relates to transmission of power, and is particularly suitable for the requirements of transmission of power in vehicles fitted with prime movers or engines developing more or less a constant torque e.g. internal combustion engines, etc.

In this invention the required torque characteristic for the vehicle is obtained by the introduction of two or more parallel lines of transmission suitably arranged, at least one of which is a purely mechanical drive throughout, whereas the other drives may incorporate according to specific needs, one or more fluid torque converters along with, or as substitutes, one or more fluid couplers geared through constant mesh gears to give the designed torque multiplication in each line of transmission. The invention, therefore, in addition provides means whereby one or the other line of transmission can be engaged depending upon the load or the speed of the vehicle.

One object of the present invention may be stated as the provision of means whereby initial torque multiplication is applied through fluid transmission lines, but in the later stages the transmission is switched over to a purely mechanical drive in a simple and practical manner.

To indicate the principles involved and one manner of their useful employment, a simple unit is described in what follows in connection with the accompanying drawings. The invention is not limited to the particular embodiment shown and described, that embodiment being set forth herein as an example of a suitable form of mechanical transmission according to the invention.

In the drawings:

Fig. 4 is a characteristic curve diagram based on assumed data.

Figure 1:
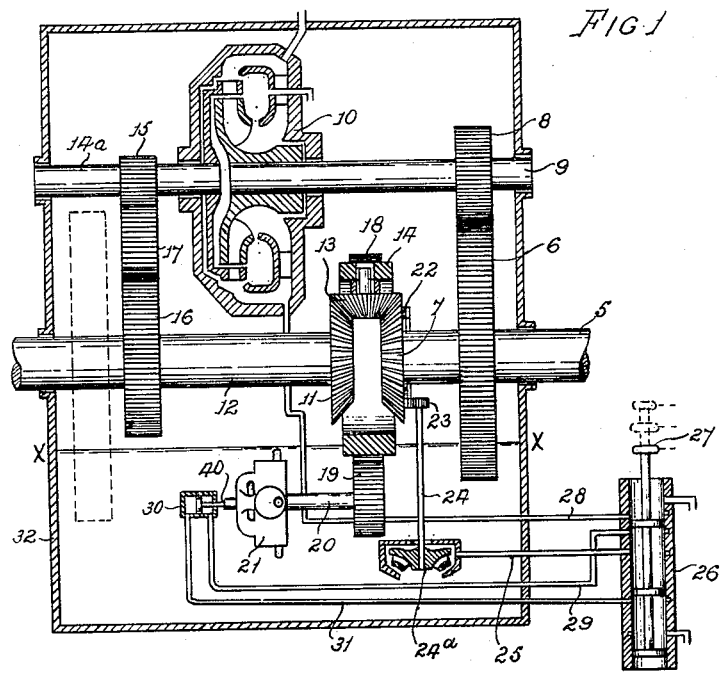
Fig. 1 is a sectional elevation of a transmission apparatus arranged according to the invention.

Referring first to Fig. 1 of the drawings, the main input shaft 5 has mounted on it a gear wheel 6 and a bevel wheel 7. The gear wheel 6 engages with gear wheel 8 on shaft 9 which is the input shaft of the torque converter 10.

The bevel wheel 7 drives a further bevel wheel 11 on its shaft 12 through the differential gearing having planetry bevel wheels 13 (only one being shown) mounted in the annular ring 14. These bevel wheels 13 are, as is usual in a differential arrangement, entirely free to rotate on their axes.

The output shaft 14a of the converter 10 has mounted on it a gear wheel 15 which engages with gear wheel 16 through an intermediary gear wheel 17. This intermediary gear wheel 17, which is shown unsupported in Fig. 1, is to obtain the correct direction of rotation of the gear wheel 16 which is mounted on the transmission output shaft 12.

The annular ring 14 is freely rotatable but is provided with an arrangement to arrest its motion when required. For output up to a certain limit the simple arrangement of a friction back brake running around the outer surface of the annular ring 14 would suffice, actuated mechanically, electromagnetically or hydraulically. For higher horse powers, or where it is deemed necessary to protect the prime mover from sudden shocks, the arrangement shown in Fig. 1 combines the functions of bringing the annular ring to a stop when required, and of absorbing sudden shocks by permitting the annular ring 14 to have limited motion. In other words, no additional fluid coupling would be required to protect the prime mover from sudden shocks. The annular ring 14 as shown in Fig. 1 has gear teeth 18 cut on its outside, meshing with gear wheel 19 on a shaft 20 of a mechanism 21 hereafter referred to as "fluid brake," shown enlarged and in more detail in Figs. 2 and 3.

In Fig. 1 there is shown an oil pump 24a which has a fixed and constant drive from a toothed ring on the face of the wheel 7 through a pinion 23 and shaft 24 and connected to the oil pump by a pipe 25 is a fluid control valve 26 having three positions of control as shown by the three positions of the valve head 27 in full and dotted lines.

The valve head 27 controls the oil passages of the valve 26 and on its position depends the selection of the line of transmission engaged. As shown in Fig. 1 the head 27 is restricting the passage of oil to the converter 10 through the pipe 28 but is permitting the oil to move along the pipe 29 into the stop valve 30 of the fluid brake 21 and moves the stop valve 30 into the "free" position. Therefore the annular ring 14 is free to rotate and no power is transmitted through the differential 13 nor can it be transmitted through converter 10 which is empty of oil. This is therefore the neutral position of the valve head 27.

If now the valve head 27 is raised one step to the first dotted position, the oil passage 28 to the converter 10 is connected to the pump 24a and the converter is filled with oil. The fluid brake 21 is still held in the "free" position. Therefore transmission is now through the torque converter 10. This is the heavy duty drive position.

If the valve head 27 is raised another step to the second dotted position, the oil passage 28 to the torque converter 10 is restricted whilst oil is let into the other side of the stop valve 30 by the tube 31 on fluid brake which moves this valve into the "engaged" position. The fluid brake 21 now restricts the rotation of the ring 14 and a positive mechanical drive is established while the torque converter 10 is emptied of its oil. As shown in the drawings, the transmission through the mechanical drive has a torque multiplication of 1:1, i.e. when a differential arrangement of the type shown is used.

Alternatively, epicyclic gearing arrangements could be usefully made to replace the differential gear arrangement shown in Fig. 1, and then the torque ratio could be different from 1:1. By a similar method as explained above, the transmission could be engaged through the epicyclic gears, or any other parallel line of fluid transmission by holding the epicyclic gears in the "engaged" or "free" position whilst fluid lines are empty or filled with oil respectively.

In certain types of vehicles such as automobile cars and trucks, it is not merely desirable but a most essential safety requirement that the vehicle should run in the reverse gear at a strictly limited speed, and this can be effected by providing a gear wheel 32 which can be slid along the shaft 12 to take the place of the wheels 16 and 17 and thus provide a reverse movement. When a vehicle is required to run in either direction with equal and similar output characteristics, e.g., railroad locomotives or cars, any of the existing mechanical reversing arrangements could be coupled on as additional to this type of transmission to form a satisfactory unit capable of forward and reverse motion.

Figures 2, 3:
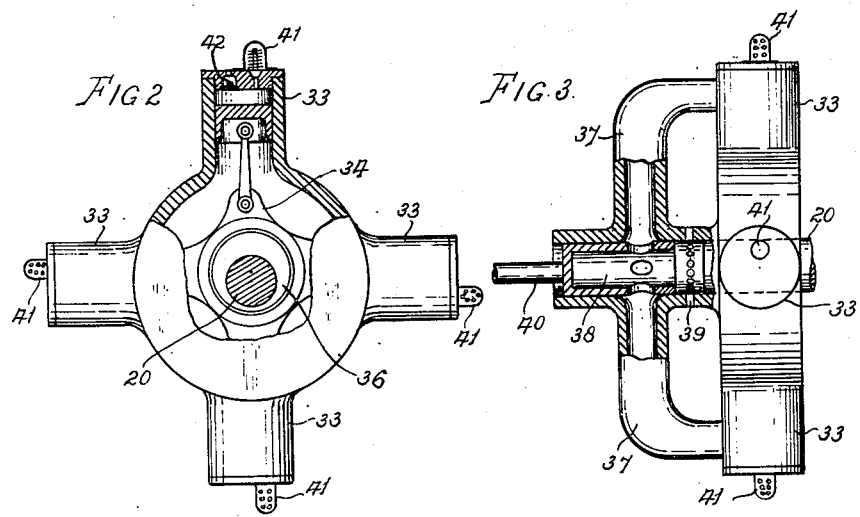
Fig. 2 is an end view partly in section of a fluid brake used therein.
Fig. 3 is a side view of the fluid brake partly in section.

Figs. 2 and 3 show in more detail the fluid brake 21 and explain its functions of stopping the motion of the annular ring 14 and shock absorption along the line of transmission to protect the prime mover from sudden shocks. This fluid brake 21 is completely immersed in the working fluid, the level of which is indicated by the line x—x. There are four cylinders 33 radially arranged with connecting rods connected to an eccentric sheave 34. The shaft 20 driven by gear wheel 19 has an eccentric 36 mounted on it which makes the four pistons move to and fro in their respective cylinders 33. All the four cylinders 33 are connected to each other by passages 37 running from each cylinder to a central sleeve valve 38 (Fig. 3). The movement of the sleeve valve 38 isolates all four cylinders, or connects them to each other as well as to the fluid in which the fluid brake is immersed through openings 39 as can be seen clearly from Fig. 3. It is obvious that piston motion is restricted when the sleeve valve 38 lies in such a position as to isolate all cylinders and the fluid in the cylinders can not move. This is therefore the "engaged" position of the fluid brake. When the sleeve valve 38 is moved to the position shown in Fig. 3 to inter-connect all cylinders the fluid brake is then in the "free" position. The sleeve valve 38 is on a rod 40 and is moved to and fro as oil is let in to either side of the valve 30.

The cylinder covers, as shown in Figs. 2 and 3, are provided each with a spring loaded valve 41 which can let out oil from the cylinder when the pressure in the cylinder rises beyond the maximum value to which the relief valve has been set. This is likely to happen when sudden load is applied on the transmission, or in the case of sudden shock. Thus, if valve 41 were open, the annular ring 14 of the differential arrangement could move, thereby preventing severe shocks being transmitted to the prime mover. A oneway ball valve 42 in each cylinder cover admits oil on the inward stroke of the piston if any oil has been thrown out of the cylinder on its outward motion as can be seen from Figs. 2 and 3. The fluid brake could as well be designed on the same principle but with less or greater number of cylinders arranged radially or otherwise and with crank arrangement instead of the eccentric. The design would then be more involved. It is also immaterial whether the sleeve valve 38 is actuated mechanically, electro-mechanically or hydraulically. In Fig. 1, however, for simplicity it is shown to be actuated hydraulically.

Similarly, the valve operating means 27 of the transmission could be automatically actuated with varying speed or load conditions, or manually operated by the driver of the vehicle.

An actual torque characteristic curve for the vehicle is, as shown in Fig. 4, based on assumed data. The curve and data are self-explanatory.

I claim:

1. A power transmission unit which is adapted particularly to be disposed between the input and output shafts of a rail vehicle, said unit comprising at least one mechanical line of transmission, at least one line of transmission including a hydrodynamic device arranged in parallel with said mechanical line of transmission, a planetary wheel arrangement arranged in said mechanical line of transmission, means for selectively rendering effective the mechanical or the hydrodynamic line of transmission, said means including a transmission oil bath, a gear wheel in braking connection with said planetary wheel arrangement and a hydraulic brake immersed in the transmission oil bath and in control of said gear wheel, said brake having brake cylinders, a passage adapted to interconnect said brake cylinders, a hydraulic cylinder control valve in fluid passing control of said passage whereby said cylinders are isolated when the fluid flow in said passage is prevented by said control valve, and said cylinders are in communication when fluid is allowed to pass freely in the passage by said control valve, a one way valve and a pressure relief valve being disposed in each of said cylinders, said relief valve serving to limit the shock loading of the transmission parts at the time of changing over under load conditions from the hydrodynamic to the mechanical lines of transmission.

2. A power transmission unit as defined in claim 1 in which the mechanical line of transmission including said planetary gear arrangement and the transmission line including the hydrodynamic device are disposed in a parallel shaft arrangement with each of said lines having an input shaft and an output shaft, and there are provided constant mesh gears interconnecting said input shafts and constant mesh gears interconnecting said output shafts.

3. A power transmission unit as defined in claim 1 wherein said means include a fluid control valve in communication with said transmission oil bath and arranged in selective control of said hydraulic cylinder control valve and the hydrodynamic device, said fluid control valve being arranged to allow fluid to pass under pressure into said hydrodynamic device when said hydraulic cylinder control valve is positioned to permit fluid flow between the cylinders of said hydraulic brake and to prevent the fluid flow to said hydrodynamic device when the cylinders in said hydraulic brake are in fluid isolation.

References Cited in the file of this patent

UNITED STATES PATENTS

| | | |
|---|---|---|
| 1,621,228 | Wiberg | Mar. 15, 1927 |
| 1,644,614 | Sanderson | Oct. 4, 1927 |
| 1,695,099 | Hight | Dec. 11, 1928 |
| 1,960,705 | Kochling | May 29, 1934 |
| 2,126,547 | Fottinger | Aug. 9, 1938 |
| 2,276,794 | Ricci | Mar. 17, 1942 |
| 2,511,039 | Black et al. | June 13, 1950 |
| 2,782,660 | Davis | Feb. 26, 1957 |
| 2,810,304 | Ball | Oct. 22, 1957 |